June 1, 1926.  
W. N. BOOTH  
DRIVING LUG FOR DEMOUNTABLE RIMS  
Filed April 2, 1919
1,587,142
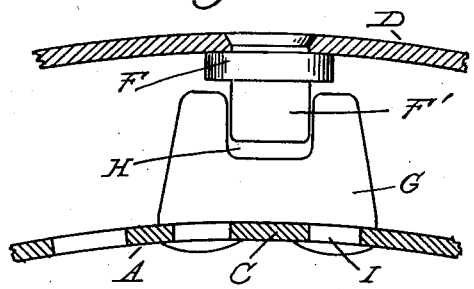
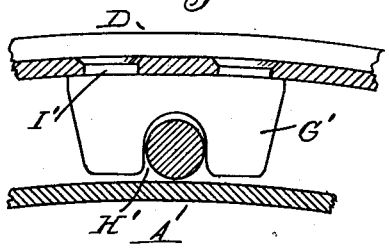
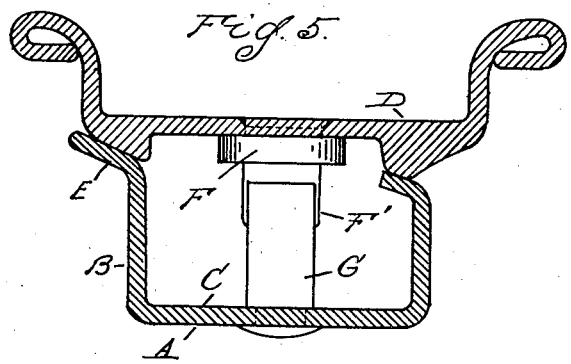
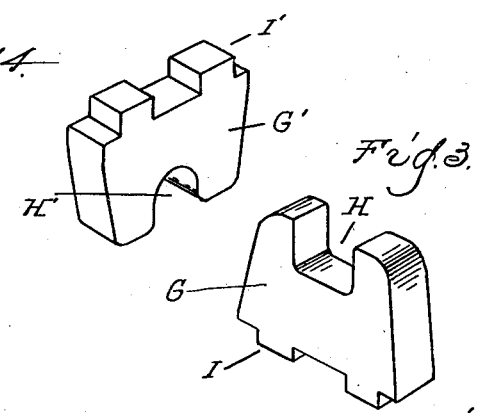
Inventor  
William N. Booth
By Whittemore Hulbert & Whittemore
Attorneys

Patented June 1, 1926.

1,587,142

UNITED STATES PATENT OFFICE.

WILLIAM N. BOOTH, OF DETROIT, MICHIGAN.

DRIVING LUG FOR DEMOUNTABLE RIMS.

Application filed April 2, 1919. Serial No. 286,995.

The invention relates to demountable rims and has more particular reference to rims which are mounted upon metallic channel fixed rims.

The invention consists in the peculiar construction of driving lug through which the torque of the wheel is transmitted to the demountable rim, as hereinafter set forth.

In the drawings:—

Figure 1 is a sectional elevation through a portion of the fixed rim and demountable rim of a vehicle wheel to which my improvement is applied;

Figure 2 is a similar view showing a modified construction;

Figures 3 and 4 are perspective views of the lugs respectively shown in Figures 1 and 2, detached.

Figure 5 is a cross-section of Figure 1.

In the securing of demountable rims upon vehicle wheels it is essential to provide driving means for transmitting the torque and for preventing creeping of the rim upon the fixed rim. Where the demountable rims are used in connection with wooden fellies having metallic outer bands or rims, the latter are usually in close proximity to the demountable rim so that it is a simple matter to provide interengaging shoulders. On the other hand, where the demountable rim is to be used upon a metallic fixed rim of channel section, the bottom of the channel is spaced from the rim by the depth of the side flanges of the channel. It is frequently necessary to use demountable rims interchangeably with metallic and wooden fixed rim wheels, so that provision must be made on the metallic fixed rims for engagement with driving members on the demountable rim, primarily intended for engagement with wooden felly wheels. One of the features of my improvement therefore relates to a construction of driving lug which is attached to a channel fixed rim and is adapted to receive a co-operating member on the demountable rim, the construction being as follows:

A is the fixed rim of channel cross-section having the side flanges B and bottom C. D is the demountable rim which engages bearings at the periphery of the side flanges B, preferably formed by laterally extending inclined flanges E. F is the driving lug on the demountable rim which is riveted or otherwise secured thereto and has an inwardly projecting portion F' which extends for but a short distance from the rim.

To engage the driving lug F I have provided a lug G which is mounted within the channel of the fixed rim, extending radially outward therefrom and having a slot H in its outer face for receiving the lug F. To secure the lug G, it is formed with projecting pins I which engage corresponding apertures in the bottom C of the fixed rim and are secured by riveting. Inasmuch, however, as the point of engagement of the lug F with the lug G is separated from the point of attachment of the latter to the fixed rim, there is danger of stresses which might loosen the lug and effectually separate the same from the fixed rim. Such a result I have avoided by laterally offsetting the pins I from the radial plane of the lug F so that torque stresses transmitted from the one to the other will place the lug in compression. The wheel is, however, driven in reverse direction, which necessitates a pair of the pins I respectively offset upon opposite sides of the radial plane of the lug F and each being riveted to the bottom C of the fixed rim.

Where the demountable rim is to be used solely upon channeled fixed rims the driving may be effected by an inwardly extending lug on the rim, which is slotted for engagement with one of the rim clamping bolts. Such a construction is shown in Figure 2, in which G' is the lug having the central transverse slot H' on its inner side. On the outer face of this lug are pins I' which are offset on opposite sides of the radial plane of the slot H' and engage apertures in the rim to which they are secured by riveting.

With each of the constructions which have been described the transmission of the torque through the lug will place the latter in compression against the rim at one point of securing, and where the wheel is driven in reverse direction the same effect would be produced on the opposite portion of the lug, and there will, therefore, be no tendency to loosen the lug from the member to which it is attached, whatever torque stresses may be transmitted therethrough.

What I claim as my invention is:—

1. The combination with a channeled vehicle wheel rim and a demountable rim therefor, of a driving lug for transmitting torque from one to the other in substantially their central planes of rotation, said driving lug having centrally located means for detachably engaging one of said members and integral means of engagement with the other of said members, said integral means comprising members offset on opposite sides of the radial plane of said detachable engagement means.

2. The combination with a channeled vehicle wheel rim and a demountable rim therefor, of a lug for transmitting torque from one to the other in substantially their central planes of rotation, having a central transverse slot on one side thereof and a pair of pins projecting from the opposite side thereof and respectively upon opposite sides of the radial plane of said transverse slot, said pins engaging corresponding apertures in substantially the central plane of rotation of one of said members and being secured therein.

3. The combination with a demountable rim, of a channeled vehicle wheel rim providing a seat for engagement by said demountable rim and having a clamping bolt extending transversely therethrough, and a driving lug secured to said demountable rim having a central transverse slot in one edge thereof for engagement in by said clamping bolt and a pair of pins projecting from the opposite edge thereof and respectively upon opposite sides of the radial plane of said slot, said pins engaging corresponding apertures in substantially the central plane of rotation of said demountable rim and being secured thereto.

4. The combination with a flanged vehicle wheel rim and a demountable rim therefor, of means located in substantially the central planes of rotation of said rims for transmitting torque from one rim to the other, said means including a driving lug and a cooperating member, said cooperating member being secured to one of said rims in substantially its central plane of rotation and said driving lug having means for detachably engaging said cooperating member and permanent means of engagement with the other of said rims in substantially its central plane of rotation, said permanent means including members offset on opposite sides of the radial plane of said detachable engagement means.

In testimony whereof I affix my signature.

WILLIAM N. BOOTH.